Dec. 31, 1957     R. EICHENAUER     2,818,081
TIRE INFLATING AND TESTING DEVICE
Filed June 21, 1956
FIG. 1
FIG. 2
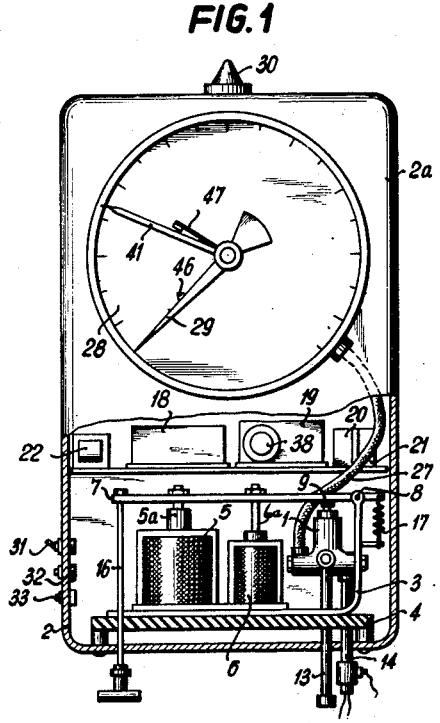
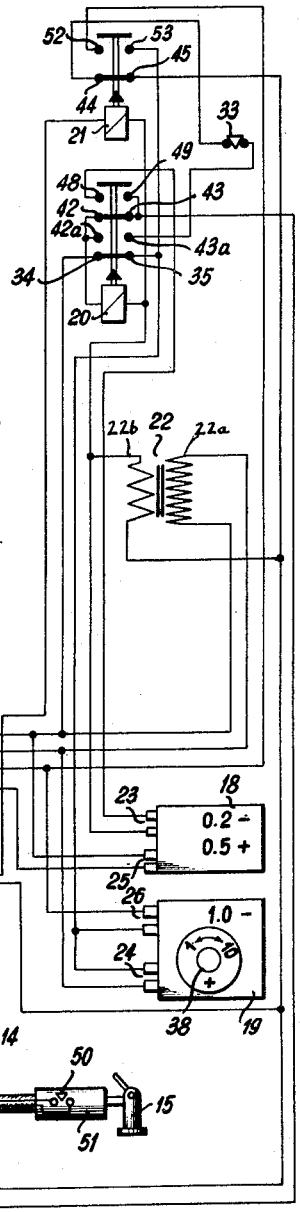
INVENTOR
Rudolf Eichenauer
By BSchlesinger
Attorney

United States Patent Office 2,818,081
Patented Dec. 31, 1957

2,818,081

TIRE INFLATING AND TESTING DEVICE

Rudolf Eichenauer, Frankfurt am Main, Germany

Application June 21, 1956, Serial No. 592,954

12 Claims. (Cl. 137—224.5)

The present invention relates to apparatus for automatically inflating a tire of an automotive vehicle to a predetermined pressure. In a still more specific aspect, the invention relates to compressed air tire-inflating apparatus in which through electromagnetically operated means a valve is intermittently opened and closed to alternately permit flow of compressed air to the tire, which is being inflated, and measurement of the pressure in the tire, so that when a desired predetermined pressure is attained, the inflating operation will cease, and a signal will be given to the operator.

Apparatus of this general nature have already been described in my pending U. S. patent applications Serial Nos. 362,327, filed June 17, 1953, now Patent No. 2,788,795 of April 16, 1957, and 493,696, filed March 11, 1955. The present invention relates to an improvement on the devices of my prior applications.

In the apparatus of the present invention there are provided two electrical timers, each of which operates automatically, and which are combined with an electrically-controlled valve assembly and with a pressure gauge having an associated pressure-responsive switch in such manner that compressed air is supplied to the tire and the pressure of air in the tire is tested alternately under control of one of the timing switches until the pressure in the tire reaches or exceeds the desired predetermined value as indicated by the pressure gauge. The gauge is provided with a pressure-indicating pointer, and a pre-set index arm. The index arm is pre-set to the pressure desired in the tire. The pointer carries an electrical contact that is engageable with another electrical contact on the index arm. When the pointer reaches the index arm, the contacts close a circuit to a relay which brings the second automatic timing switch into operation. This controls the valve-assembly so that the pressure in the tire is alternately relieved and tested. The relay is locked in the operative position by a self-hold circuit so that automatic alternate relief of the air pressure from the tire and testing of the pressure of the air remaining in the tire proceeds alternately until the pressure indicating pointer contact has become disengaged from the contact on the index arm. Opening of these contacts occurs precisely at the pressure to which the index arm of the gauge has been set. When this occurs the inflating operation ceases.

In the drawings:

Fig. 1 is an elevation, partly broken away, of a tire filling and gauging apparatus built according to one embodiment of this invention; and Fig. 2 is a combined electric and pneumatic circuit diagram of this apparatus.

In the apparatus shown, 2 denotes the housing or casing for the apparatus. In this housing 2 there is mounted a known type of two-way air valve 1. This valve is mounted on a base plate 3 made of spring steel and having an arcuately upturned portion at one end. The plate 3 is supported on a rubber plate 4, which is mounted in the lower part of the casing 2.

Two solenoids 5 and 6 are mounted side by side on the plate 3. Also mounted on the plate 3 is a rocker arm 7. This is pivotally mounted at 8 on the upper end of the portion of the plate 3. The armatures 5a and 6a of the two solenoids 5 and 6, respectively, are connected to the rocker arm 7 so that on energization of either solenoid the core or armature of that solenoid pulls down the rocker arm 7. A spring 17 serves to urge the rocker arm 7 constantly to starting position.

The housing 1 is provided with three axially spaced valve seats, an upper valve seat, an intermediate valve seat, and a lower valve seat. The valve means itself is made in two parts which normally, as shown in Fig. 2, are axially spaced from one another. The upper part has a head 9 and two axially spaced valve portions 10 and 11. The lower valve has a valve portion 12. The rocker arm 7 bears against the head 9 of the upper valve member. The valve portion 10 of this upper valve member is adapted to seat against the uppermost seat of the valve housing. The valve portion 11 of this upper valve member is adapted to seat against the intermediate valve seat of the valve housing; and the valve portion 12 of the lower valve member is adapted to seat against the lowermost seat of the valve housing. In the position shown in Fig. 2, the stems of the two valves are axially spaced from one another.

Compressed air is continuously fed to the valve housing 1 through the piping 13. The valve housing 1 is connected by tubing 14 with a filling nipple 15 that is adapted to be applied to the valve stem of the tire which is to be inflated. The valve housing 1 is also connected by tubing 27 with a pressure gauge 28 which is mounted in a circular opening in the upper portion 2a of the housing 2.

The valve portion 10 is constantly pressed toward its seat by the compressed air flowing from supply line 13, although an auxiliary spring not shown may also be used for this purpose.

The solenoid 5 is larger than the solenoid 6 and exerts a greater pull on the rocker arm 7, thereby effecting a greater movement of that arm.

When the rocker arm 7 is rocked downwardly by the solenoid 5, the valve portion 10 is moved away from its seat, and the valve portion 11 is moved into engagement with its seat. At the same time the valve portion 12 is lifted off its seat by engagement of the stem of the upper valve member with the stem of the lower valve member. This permits the compressed air to flow from the supply pipe 13 through the tubing 14 and the inflating nipple 15 into the tire. Simultaneously air can exhaust from gauge 28 to atmosphere through the open valve portion 10.

The solenoid 6 can rock the rocker arm 7 only a small distance downward, the construction being such that this lifts the valve portion 10 from its seat without seating the valve portion 11 and without forcing the valve portion 12 off its seat. This permits the air to be evacuated from the gauge 28 and from the tire.

An auxiliary, manually-operated pull rod 16 is provided to permit the rocker arm 7 to be manually operated in an emergency, for instance, if the electrical power supply for the solenoids failed. This pull rod extends outside of the casing 2, and has a handle attached to it outside of the casing for manipulation of the rod.

Since the arcuately upturned portion of the spring steel base plate 3 carries both the pivot 8 for the rocker arm 7 and the valve housing 1, the pull of the solenoid cores 5a and 6a and of the rod 16 are absorbed elastically.

Above the valve assembly, and enclosed in a moisture-proof sealed part 2a of the casing are two automatically operating electric timing switches 18 and 19, two control relays 20 and 21, a transformer 22, and the gauge 28.

The timing switches 18 and 19 are of known type and are shown simply in outline. The timing switch 18 has two pairs of terminals 23 and 25, while the timing switch 19 has two pairs of terminals 24 and 26. The terminals 23 and 24 connect with the operating coils of the relays 20 and 21, and the terminals 25 and 26 connect with the contacts of the switches of these relays as will be described further hereinafter.

On top of the casing there may be mounted a flasher bulb 30 which constitutes a signal to the operator that the tire has been pumped up to the desired pressure.

Switches 31, 32 and 33 are mounted on one side wall of the casing for manipulation of the apparatus as explained hereinafter.

Fig. 2 shows one way in which the device may be wired electrically in order to accomplish its purpose. When the main switch 36 is closed, current will flow from the main line 37 through the contacts 34 and 35 of the relay 20 and the terminals 26 of the timing switch 19, and through the solenoid coil 5 back to the main line 37a, energizing the solenoid to pull down the rocker arm 7 far enough to open valve portions 10 and 12 and close valve portion 11. This allows compressed air to flow from the supply line 13 through the hose 14 and nipple 15 into the tire. At the same time it allows the air to be evacuated from the gauge 28 through the hose 27, and out of the now-opened valve portion 10.

At the same time that solenoid coil 5 is energized, the operating coil of the timing switch 19 will be energized from the main line 37 through the closed switch 36, the contacts 34 and 35 of the relay 20, the terminals 24 of the timer, and the main line 37a.

The period during which the compressed air flows to the tire will depend upon the setting of the timer 19. When the timer operates, the circuit will be broken through the solenoid 5, and the rocker arm 7 will be returned to its original position by the spring 17. The valve portions 12 and 10 will thereupon again be seated and the valve portion 11 will again be lifted off its seat. This will cause air to flow through nipple 15, hose 14, the now-opened valve member 11, and the hose 27 to the gauge 28. The time during which the air flows from the tire to the gauge will also be determined by the setting of the timer. Then the timer 19 will function again to close the circuit to the solenoid 5, thereby again opening the valve portions 10 and 12, and closing the valve portion 11, to permit flow of the compressed air again from the supply line 13 through the hose 14 and nipple 15 into the tire.

The solenoid 5 will be alternately energized and deenergized in accordance with the operation of the timer 19, which will open and close its switch contacts 26 in a predetermined adjustable timing sequence. The time in each cycle during which the switch 19 closes the circuit can be adjusted for periods ranging between say one and ten seconds by rotating the timing knob 38. On the other hand the duration of the break is preferably constant and adjusted conveniently to one second.

The primary coil 22a of the transformer is energized from main line 37 through closed switch 36, the current flowing back to the main line 37a.

The gauge 28 has a pointer 29 which is adapted to be rotated when air flows from the tire into the gauge. It has another pointer 41 which is preset by the operator to the pressure desired in the tire. The pointer 29 has an electrical contact 46 on it, which is adapted to make contact with a contact 47 carried by the pointer 41, when the tire has been filled to the predetermined pressure.

In the portion of each cycle of operation of the apparatus, when air flows from the tire through the nipple 15, hose 14, open valve portion 11 and hose 27 into the gauge 28, the pointer 29 is advanced toward the pointer 41. In the portion of each cycle of operation of timer 19 when the solenoid 5 is energized, the compressed air again flows to the tire to increase the pressure in the tire. Each time that the timer 19 functions, therefore, to break the circuit to the solenoid 5, and to connect the tire with the gauge, the pointer 29 is moved in accordance with the pressure built up in the tire.

When the pointer 29 has moved far enough for the contact 46 to engage the contact 47, the circuit of the secondary 22b of the transformer is closed through the contacts 42, 43 and the energizing coil of the relay 20. This will cause the relay 20 to operate to open the contacts 34, 35, and 42, 43. The opening of the contacts 34, 35 will break the circuit to the timer 19. The solenoid 5, therefore, can no longer receive current so that the inflation of the tire ceases.

A fitting (not shown) with a reduced bore diameter is preferably employed in the gauge to reduce the flow of air to and from the gauge to prevent too rapid movement of the pointer.

The opening of the contacts 42, 43 will break the circuit to the coil of the relay 20 through the secondary 22b of the transformer. The break in the circuit to the coil of the relay 20, due to the opening of the contacts 42, 43, will, however, be only momentary because the relay coil is immediately reenergized through the closing of the contacts 42a, 43a. These latter contacts provide a holding circuit. This holding circuit extends through the manually operable switch 33, the contacts 44 and 45 of the relay 21, the contacts 46 and 47, and the secondary 22b. Through this arrangement, the coil of the relay 20 continues to be energized until either the contacts 44, 45 are opened by operation of the coil of relay 21, or the circuit is interrupted by manually opening the switch 32.

The change over in the connections completes the circuit to the coil of the timing switch 18, this circuit being completed from the secondary 22b of the transformer 22 through the contacts 46, 47 of the gauge 28, the contacts 48 and 49 of the relay 20, and the terminals 23. This closes the contacts of the timing switch 18 at the terminals 25, closing a circuit from the main line 37 through the closed switch 36, the terminals 25, the solenoid 6 back to the main line 37a. Simultaneously the circuit is closed through the signal light bulb 30.

The lighting of the bulb 30 informs the attendant that the desired pressure has been attained in the tire. The energizing of the solenoid 6 rocks the rocker arm 7 down far enough for the valve member 10 to be opened without closing the valve member 11, and without opening the valve member 12. The air in the pressure gauge 28, as well as the air in the tire can, therefore, escape to atmosphere, but no further compressed air will be supplied from the line 13 to the tire. The rocker arm 7 will remain down, and the valve member 10 will remain open only so long as permitted by operation of the timer 18. This may occur for say half a second. Then the timer will function again to deenergize the solenoid 6, permitting the spring 17 to return the rocker arm to its original position, closing valve member 10, and permitting the air from the tire to again flow to the pressure gauge 20 to indicate the reduced pressure of the tire. When the valve member 10 is so closed, the pointer 29, which has dropped back slowly during the pressure-relief period, again advances in conformity with the pressure in the tire. If the pressure in the tire is still sufficiently high for the pressure indicating pointer 29 to engage the index pointer 41 and for the pointer contact 46 to make contact with the index contact 47, the pressure-relief cycle will repeat.

Alternate periods of relief of pressure from the tire and measurement of the pressure of the air remaining in the tire will continue until the contact 46 no longer engages the contact 47 on a pressure measuring period. Separation of the two contacts will occur exactly at the point which conforms to the preset-pressure desired in the tire. Since the circuit for energizing the automatic timing switch 18 is interrupted when this separation occurs, the apparatus will then cease to operate. The pressure now in the tire conforms exactly with the desired determined pressure. The nipple 15 may now be removed from the tire and attached to another tire.

If it is desired to interrupt the inflating process for any reason, the same effect, as is produced by engagement of the pressure gauge contacts 46 and 47, can be achieved by depressing the push button switch 32, which is connected in parallel with the pressure gauge contacts 46 and 47, as shown in Fig. 2.

To reset the apparatus for inflating another tire, the coil of the relay 20 must first be deenergized. This can be done either by opening the manually operable switch 33, or by momentarily depressing the switch button 50 on the ferrule 51 at the tire end of the hose 14. When the relay energizing circuit is broken, all the circuits of the apparatus return to initial position so that the tire pumping procedure can be repeated for inflating another tire.

As has been stated, the release of the relay 20 can be effected by depressing the switch button 50 on the ferrule 51. For this purpose, the line for feeding the coil of the relay 21 is led through the switch 50, and the line for energizing the coil of the relay 20 is led through the contacts 44 and 45, which are opened when the coil of the relay 21 is energized.

By locating the switch 50 on the ferrule of the hose 14, hand control of the apparatus from a position near the tire being inflated is possible. The necessary leads for the switch run inside the hose 14.

Furthermore, inflation of the tire can be manually controlled by the operator at the tire. For this purpose, the push button switch 50 is closed. As already described this will energize the coil of the relay 21 and cause the contacts 52 and 53 to be closed through operation of the secondary 22b of the transformer 22. Since the contacts 52 and 53 are in parallel with the contact terminals 26 of timer 19, compressed air will be supplied to the tire until the push button switch 50 is released.

The flasher lamp 30 may be replaced by an acoustic signalling device or any other suitable signal.

While the invention has been described in connection with a particular embodiment thereof, it will be understood that it is capable of further modification; and this application is intended to cover any variations, uses, or adaptations of the invention following, in general, the principles of the invention and including such departures from the present disclosure as come within known or customary practice in the art to which the invention pertains, and as may be applied to the essential features hereinbefore set forth and as fall within the scope of the invention or the limits of the appended claims.

Having thus described my invention, what I claim is:

1. A tire inflating and testing device comprising a two-way air valve, an air hose and a nipple carried thereby for conducting compressed air, a source of compressed air, two electromagnetic devices, one for operating the said air valve to cause it to connect said source with said air hose and the other to cause said air valve to release air from the air hose, two automatic electric timing switches controlling said electromagnetic devices respectively, a relay, and a pressure gauge, said pressure gauge having electrical contacts which are closed when the pressure indicated by the gauge exceeds a value pre-set on an adjustable index pointer; said relay closing a first circuit when de-energized, and opening said circuit and closing a second circuit when energized, said first circuit operating one of said timing switches to actuate periodically one of said electromagnetic devices thereby to periodically operate said air valve to perform inflation in successive periods, the length of which are controlled by said first timing switch, and the second circuit causing operation of the other timing switch through the pressure gauge contacts to operate the other electromagnetic device to produce release of the air in successive operations, and wherein said relay includes a self-locking contact and circuit means to hold said relay operated after momentary operation; and wherein the pressure gauge contacts are connected to cause operation of the relay on attainment of the pre-set pressure; the arrangement of the parts being such that inflation is effected with periodic breaks determined by said one timing switch and after the pressure gauge contacts are closed on first attainment of the pre-set pressure, said relay is energized to cause said other timing switch to perform intermittent release of air until the pressure gauge contacts have again opened which occurs when the pressure in the air hose reaches the precise required value.

2. A tire inflating and testing device as claimed in claim 1 in which the circuit for energizing the relay is taken through the contacts of a second relay which can be operated by a switch located on the air hose adjacent said nipple.

3. An air inflating and testing device as claimed in claim 1 in which the two electromagnetic devices comprise solenoids mounted on a base plate of spring steel, one end of which is arcuately upturned to form a wall for carrying the two-way air-valve, and for carrying a pivot for a rocker arm actuated by the armatures of the solenoids, said rocker arm being disposed to operate said air valve.

4. An air inflating and testing device as claimed in claim 3, in which the individual components are housed in a divided casing in such manner that the delicate electrical apparatus is located in a moisture-proof sealed upper compartment and the solenoids and the two-way air-valve are mounted on a rubber sheet in a lower compartment of the casing.

5. Apparatus for inflating a pneumatic tire, comprising an air inflating hose, a source of compressed air, a pressure gauge, an electromagnetically-actuated air valve movable to a first position to connect said air hose with said source of compressed air and movable to a second position to connect said air hose with atmosphere, means constantly urging said air valve to a third position connecting said air hose with said pressure gauge, two electromagnets for operating said air valve, one of said electromagnets when energized moving said air valve to said first position to supply compressed air to said air hose, the other of said electromagnets when energized moving said air valve to said second position to relieve pressure in the air hose, a first electric timing device for alternately energizing and deenergizing said one electromagnet whereby said air hose is alternately connected to said source of compressed air and to said pressure gauge so that periods of inflation alternate with periods of testing the pressure in the air hose, a second electric timing device for alternately energizing and de-energizing said other electromagnet whereby said air hose is alternately connected to atmosphere and to said pressure gauge so that periods of relief of pressure in the air hose alternate with periods of measuring the pressure of the air remaining in the air hose, and means operated by said pressure gauge for rendering said first timing device inoperative and for rendering said second timing device operative when the pressure reading of said gauge shows that the pressure in the air hose exceeds a predetermined pressure.

6. Apparatus for inflating a pneumatic tire, comprising an air inflating hose, a source of compressed air, a pressure gauge, an electromagnetically-actuated air valve movable to a first position to connect said air hose with said source of compressed air and movable to a second position to connect said air hose with atmosphere, means constantly urging said air valve to a third position connecting said air hose with said pressure gauge, two electromagnets for operating said air valve, one of said electromagnets when energized moving said air valve to said first position to supply compressed air to said air hose, the other of said electromagnets when energized moving said air valve to said second position to relieve pressure in the air hose, a first electric timing device for alternately energizing and deenergizing said one electromagnet whereby said air hose is alternately connected to said source of compressed air and to said pressure gauge so that periods of inflation alternate with periods of testing the pressure in the air hose, a second electric timing device for alternately energizing and deenergizing said other electromagnet whereby said air hose is alternately connected to atmosphere and to said pressure gauge so that periods of relief of pressure in the air hose alternate with periods of measuring the pressure of the air remaining in the air hose, and means controlled by said pressure gauge for determining which of said two timing devices will be operative during inflation.

7. Apparatus for inflating a pneumatic tire as claimed in claim 5 in which the means operated by said pressure gauge operates to render said second timing device inoperative when the pressure reading of said gauge shows that the pressure in the air hose has dropped to said predetermined pressure.

8. Apparatus for inflating a pneumatic tire as claimed in claim 5 in which manually-operable switch means is also provided for closing a circuit to said one electromagnet, said manually-operable switch means being mounted on said air hose.

9. Apparatus for inflating a pneumatic tire as claimed in claim 5 having a signal device, and means operated by said pressure gauge simultaneously with the first-named means operated thereby for rendering said signal device operative when the pressure reading of said gauge shows that the pressure in the air hose exceeds said predetermined pressure.

10. Apparatus for inflating a pneumatic tire, comprising an air inflating hose, a source of compressed air, a pressure gauge, electromagnetically-actuated air valve means movable through an extended distance to a first position to connect said air hose with said source of compressed air and movable through a shorter distance to a second position to connect said air hose with atmosphere, means constantly urging said valve means to a third position in which said air hose is connected with said pressure gauge, two electromagnets for operating said air valve means, one of said electromagnets when energized moving said air valve means to said first position to cause supply of compressed air to said air hose, the other of said electromagnets when energized moving said air valve means to said second position to relieve pressure in the air hose, a first electric timing device for alternately energizing and deenergizing said one electromagnet whereby said air hose is alternately connected to said source of compressed air and to said pressure gauge so that periods of inflation alternate with periods of testing the pressure in the air hose, a second electric timing device for alternately energizing and deenergizing said other electromagnet whereby said air hose is alternately connected to atmosphere and to said pressure gauge so that periods of relief of pressure in the air hose alternate with periods of measuring the pressure of the air remaining in the air hose, and means operated by said pressure gauge for rendering said first timing device inoperative and for rendering said second timing device operative when the pressure reading of said gauge shows that the pressure in the air hose exceeds a predetermined pressure.

11. Apparatus for inflating a pneumatic tire, comprising an air inflating hose, a source of compressed air, a pressure gauge, air valve means movable to a first position to connect said air hose with said source of compressed air and movable to a second position to connect said air hose with atmosphere and movable to a third position connecting said air hose with said pressure gauge, means for moving said air valve means to said first and said third positions alternately, whereby said air hose is alternately connected to said source of compressed air and to said pressure gauge so that periods of inflation alternate with periods of testing the pressure in the air hose, means for moving said air valve means to said second and said third positions alternately whereby said air hose is alternately connected to atmosphere and to said pressure gauge so that periods of relief of pressure from the air hose alternate with periods of measuring the pressure remaining in the air hose, and means controlled by said pressure gauge for determining when each of said two means for moving said air valve becomes operative during inflation.

12. Apparatus for inflating a pneumatic tire, comprising an air inflating hose, a source of compressed air, a pressure gauge, air valve means movable to a first position to connect said air hose with said source of compressed air and movable to a second position to connect said air hose with atmosphere and movable to a third position connecting said air hose with said pressure gauge, means for moving said air valve means to said first and said third positions alternately, whereby said air hose is alternately connected to said source of compressed air and to said pressure gauge so that periods of inflation alternate with periods of testing the pressure in the air hose, a first timer for controlling the operation of said moving means and controlling the times during which said air hose is connected to said source of compressed air and to said pressure gauge in each cycle of operation of said moving means, a second means for moving said air valve means to said second and said third positions alternately whereby said air hose is connected alternately to atmosphere and to said pressure gauge, respectively, so that periods of relief of pressure from the air hose alternate with periods of measuring the pressure of the air remaining in the air hose, a second timer controlling the operation of said second moving means and controlling the times during which said air hose is connected to atmosphere and to said pressure gauge in each cycle of operation of said second moving means, means operated by said pressure gauge for rendering said first timer inoperative and rendering said second timer operative when the pressure in the air hose as measured by said pressure gauge exceeds a predetermined pressure, and means operated by said pressure gauge for rendering said second timer inoperative when the pressure in the air hose as measured by said pressure gauge drops to said predetermined pressure.

References Cited in the file of this patent

UNITED STATES PATENTS

| | | |
|---|---|---|
| 1,779,670 | Griffin | Oct. 28, 1930 |
| 2,029,085 | Sussin | Jan. 28, 1936 |
| 2,568,086 | Nolde | Sept. 18, 1951 |